Jan. 26, 1932. J. VAN TREEK 1,842,573
SAW GUIDE
Filed April 3, 1929
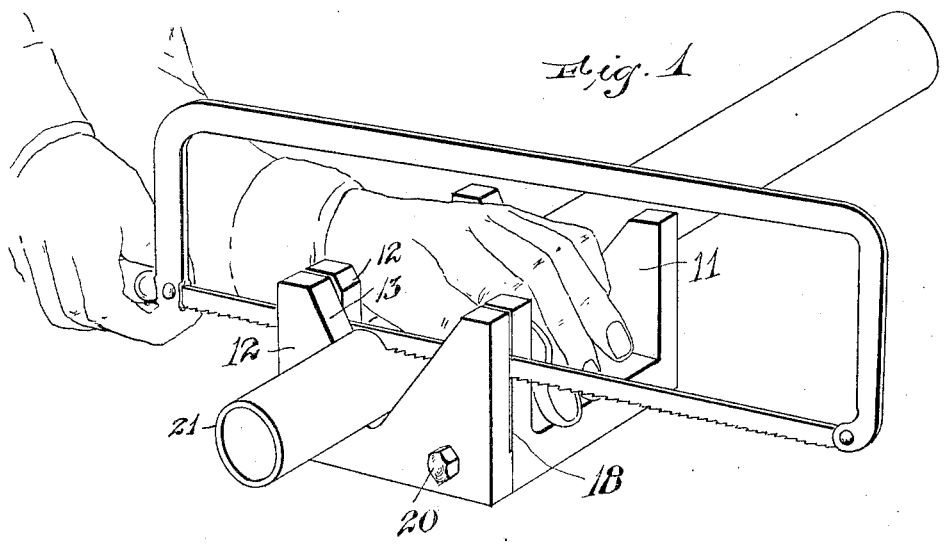
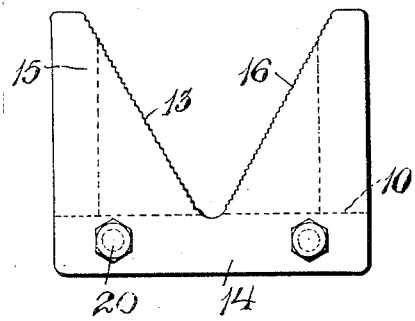
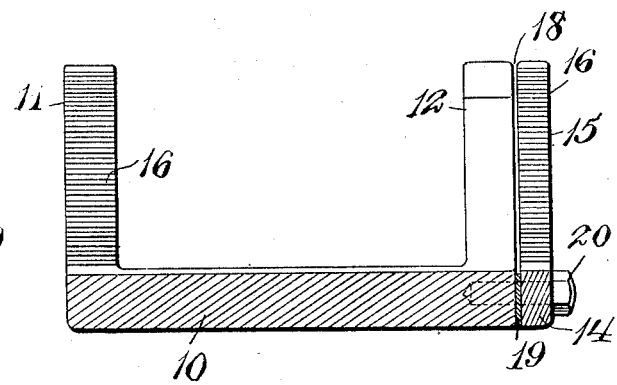
INVENTOR
Joseph Van Treek,
BY
Wm. H. Caufield.
ATTORNEY.

Patented Jan. 26, 1932

1,842,573

UNITED STATES PATENT OFFICE

JOSEPH VAN TREEK, OF NUTLEY, NEW JERSEY

SAW GUIDE

Application filed April 3, 1929. Serial No. 352,062.

This invention relates to an improved saw guide which is readily portable and is particularly adapted for use by men who cut pipe with thin walls which pipes require a square cut without burrs.

In modern practice the water pipes for connecting street mains to houses are cut at the place of installation. These pipes run from half-inch to two-inch sizes and are of copper. The pipe when cut is forced outward at its end by driving a flanging tool on said end and this flange is seated in a union coupling. In order to secure an even tight joint and thus insure the joint against leaking the end of the pipe must be cut square across and without a burr.

The object of this invention is to provide a saw guide that will receive small and large tubes which are held in place by the hand and in which a saw is guided to cut straight across a tube.

The object of the invention is also to provide a guide which is provided with a slot for a hack saw and which will resist the saw and thus prevent the sawing of the guide. Furthermore, the slot for the saw is formed between separate pieces which can be hardened and the slot is not distorted or closed by the hardening process.

The invention is illustrated in the accompanying drawings, in which Figure 1 illustrates the saw guide and tube seated therein and also shows the way in which the device is used. Figure 2 is an end view of the saw guide and Figure 3 is a central longitudinal section of my device.

The saw guide comprises a base 10 on which is placed two V-shaped jaws 11 and 12, one at each end. The jaws have tapered walls 13 which receive pipes of various sizes and hold them securely in place when they are held by the hand as shown in Figure 1.

The end piece 14 is substantially of the same shape in cross section as the main part of the guide, having the V-shaped openings formed between the posts 15, thus forming jaws similar to the jaws 13.

The opposed faces 13 converge toward the base at an angle less than 45 degrees. This arrangement of the faces at an acute angle supports the pipe not much below the centre of the pipe and forms side supports that hold their copper pipes against distortion from the circular cross sectional shape under normal sawing pressure. This arrangement also allows a relatively slight pressure when sawing as the tube is held against rotation which rotation is likely to occur when right angled or wider jaws are used.

The inclined faces of the jaws are preferably roughened by knurling or by forming small teeth 16 thereon. This keeps the tube from turning in the sawing operation.

The plate 14 is spaced from the jaw 12 to form the saw slot 18. This is formed by placing a narrow plate 19 between the base 10 and the plate 14 or there may be a projection-piece on one of these members. The bolts or screws 20 secure the plate 14 to the base 10. The plate 14 can be hardened or case-hardened and so can the jaws 12 and the sides of the slot 18 can be finished before assembling the parts to provide a straight slot 18 of even width throughout and which will not allow the saw to deviate or tilt sufficiently to destroy the straight transverse cut across the pipe 21 in the saw guide.

A workman can use this saw guide on the job, that is, he can cut off the pipe to suit the circumstances and can be assured that a clean straight cut without burrs is the result.

I claim:—

1. A saw guide comprising a flat base, a pair of jaws at one end of the base, a second pair of jaws closely adjacent the first pair to form a slit between them for the passage of a saw, the surfaces of the opposed faces of the jaws being convergent toward the base at an angle less than a right angle to provide support for a thin tube a short distance below the centre thereof.

2. A saw guide comprising a flat base with a pair of jaws at each end, and a plate secured at one end of the base and in close proximity thereto to form a slit to receive a saw, the jaws being of substantial thickness and of substantial width to provide a guiding surface for a considerable length of a saw blade to keep the same aligned, the opposed faces of the jaws converging toward the base at an acute angle to each other to support a thin tube a slight distance below the centre thereof.

In testimony whereof he affixes his signature.

JOSEPH VAN TREEK.